Patented Jan. 15, 1935

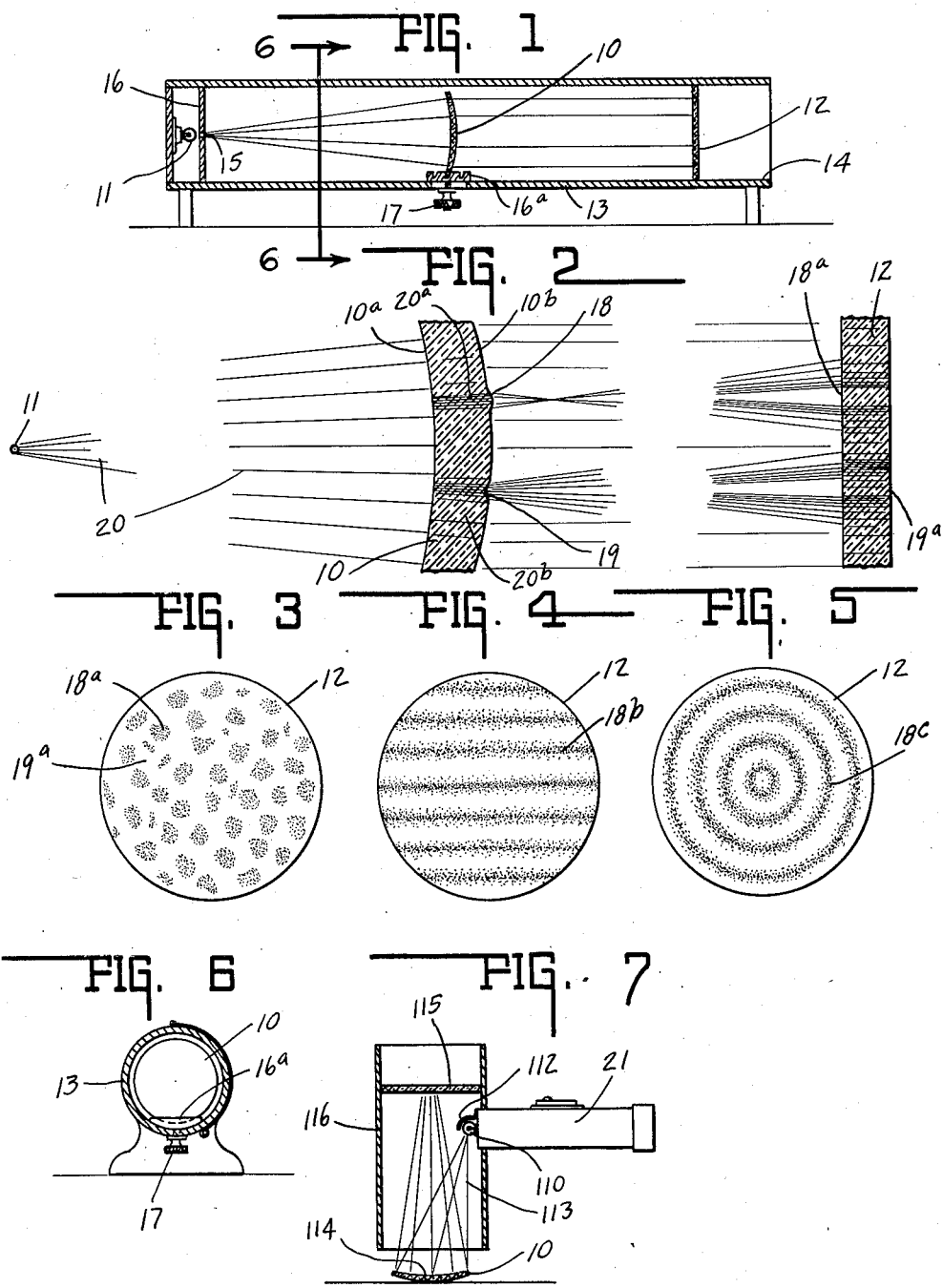

1,988,169

UNITED STATES PATENT OFFICE 1,988,169

APPARATUS FOR INSPECTING LENSES

Frank E. Duckwall, Indianapolis, Ind., assignor to Continental Optical Company Inc., Indianapolis, Ind., a corporation Application October 28, 1932, Serial No. 639,970

2 Claims. (Cl. 88—56)

This invention relates to an apparatus for inspecting optical lenses, particularly the nature of the surface polish thereof.

It is common practice to polish spectacle lenses on a tool which is covered with a piece of more or less soft felt. Fine instrument lenses are polished on a pitch tool formed to the proper shape. It is well understood that the felt polisher, while it quickly produces a polish of high luster, does not form a perfectly true surface. The term "lemon peel" surface has been appropriately applied to this type of polish. The polisher made of pitch or similar material is much harder and if properly used produces a polished surface free from irregularities.

It is often stated that a ground surface consists of minute elevations and depressions and that a pitch polisher planes off squarely the elevations until the whole surface is worn down to the level of the deepest depression. A felt polisher merely rounds over the tops without cutting them off clearly. This explanation probably serves to give some idea of the nature of the action, though the irregularities of the felt polished surface are much larger than those of the original ground surface. Various other waves, ripples and markings may also be produced, and a pitch polisher improperly used may produce streaky waves.

These surface irregularities are not readily seen on a piece of transparent glass. A trained inspector can, with proper illumination, see these defects by unaided visual observation, but one less skilled is unable to do so. No magnifier, microscope, or other instrument helps appreciably for this peculiar inspection.

It is the purpose of this invention to enable any one to see at a glance the type or nature of the polished surface of a spectacle or optical lens, through the medium of a simple apparatus, which may be transported and used by salesmen or opticians in comparing the perfections or imperfections of different lenses. This is accomplished by placing the lens to be inspected between a very small or minute source of light and a ground glass screen or the like, upon which the rays from the source of light passing through the lens are received. The light shadows produced upon the screen by variations in density of the light received through the lens, discloses and makes apparent to the untrained eye, indications of the character of the lens surface.

While the apparatus used is exceedingly simple, rather striking results are obtained. For example, if the light upon the screen shows a plurality of substantially parallel shadows, it indicates that the poishing tool has probably chattered in its work. Wherein a plurality of spotted shadows are observed on the screen, it would indicate the use of a soft felt polisher having an uneven surface or density in the felt. Thus, the true character of the surface of a lens, not otherwise commonly available, is readily recorded upon the screen.

The full nature of the invention will be more clearly understood from the accompanying drawing and the following description and claims:

Fig. 1 is a central vertical section through a structure diagrammatically illustrating the invention. Fig. 2 is an illustration of the action of the light rays on the screen effected by irregularities in the lens surface, showing an enlarged sectional view of a portion of the lens and screen. Figs. 3, 4 and 5 are elevations of different screen images. Fig. 6 is a section taken on the line 6—6 of Fig. 1. Fig. 7 is a modified form of the apparatus.

In the drawing there is diagrammatically illustrated means for accomplishing the method as applied to this invention, wherein it is desired to visualize or inspect the character of the surface of a lens 10. On one side of the lens there is provided a pin point of light 11 which may be in the form of a small pocket flash light, or a lamp, positioned behind an opaque screen provided with a minute aperture. It is quite important that the source of light be made as small as practical. On the other side of the lens there is positioned a ground glass or translucent screen 12.

An apparatus arranged in this manner must be set up in a dark room or contained in a tube, such as indicated at 13 having an open end at 14, for eliminating all light rays other than those passing from the source of light or through the aperture 15 in the opaque screen 16. Any suitable means, such as the supporting carriage 16a, may be employed for supporting the lens 10 in the tube or dark room, such carriage being adjustable longitudinally of the tube in respect to its position relative to the screen, and held in position by a set screw or similar device, as indicated at 17.

In Fig. 2, illustrative of the action of the light rays passing through the lens in a large and exaggerated manner for illustrative purposes, there are shown waves formed in the surface of the lens, as indicated at 18 and 19. The rays of light indicated at 20 will be deflected by the surface 10a of the lens, will pass through the lens and be again deflected by the surface 10b, after which they will pass to the ground glass screen 12 and illuminate the surface thereof. However, when the bundle of rays 20a strike the protruding portion 18 of the surface 10b of the lens, they will be converged so as to cross and diverge, striking the screen over an enlarged area so as to be of less intensity. Had no irregularity been present, this bundle would have illuminated only area 18a of the screen. The intensity of illumination is, therefore, considerably reduced over area 18a, and somewhat increased over the surrounding area. A recessed area in the lens, as indicated at 19, would cause the bundle of rays 20b to diverge and as before produce an area of reduced intensity of illumination at 19a, surrounded by somewhat increased illumination.

It is not likely that in practice the configuration of light rays will be so definite as herein described which is for illustrative purposes only. There will probably be indefinite and complicated shifts in the spacing of light rays, but it will be understood as a general principle that whatever the nature of the lens under examination, the variations in intensity on the screen will show approximately the shape, position, and nature of any surface irregularities that may be present.

Fig. 3 shows a mottled appearance observed on the screen and which is associated with the type of polish produced by a soft, unevenly yielding, piece of felt.

Other surface formations in the lens produce shadows such as that shown in Fig. 4, where a plurality of parallel dark streaks or shadows occur, as indicated by 18b. In Fig. 5, there is shown a screen 12 upon which a plurality of concentric shadows 18c occur.

In the modified form of instrument show in Fig. 7, the lens 10 may be laid on a table with the surface to be examined uppermost and the light and screen placed in such position as to cause the rays to be reflected onto the screen instead of passing through the lens. Thus, there is shown an ordinary flash light 21 provided with a source of light 110 having a shade 112. The rays 113 are thrown downwardly onto the upper surface 114 of the lens 10. The rays striking said surface are caused to be reflected upwardly to the screen 115 mounted in a tubular member 116 for protecting it from the outside light. The shadows on the screen 115 can then be observed from the upper open end of the tube.

If both surfaces of the lens are perfectly true, an approximately even spot of light will be seen. However, if a small element on the surface of the lens is displaced from its true position, the light passing through this area or reflected thereby will be irregularly bent and will not proceed to its proper spot on the screen. Thus, this will result in a dark spot or shadow being observed. Whatever the irregularities, a shadow image of them will be apparent, such as illustrated in Figs. 3, 4 and 5.

The invention claimed is:

1. An apparatus for observing surface formations on optical lenses, including a tubular dark chamber having an open end and a closed end, a minute source of light adjacent the closed end of said chamber, a screen adjacent the open end thereof, a carriage for supporting the lens to be inspected in said tubular chamber intermediate said source of light and screen, and means for adjusting said carriage and lens with respect to said source of light so as to cause a beam of light to be projected thereby onto said screen having substantially parallel rays.

2. An apparatus for observing surface formations on optical lenses, including a dark chamber, a minute source of light in said chamber, a screen in said chamber for receiving light rays emanating from said source, and means for supporting the lens to be tested in position to transmit the light rays from said source to said screen in substantially parallel relation.

FRANK E. DUCKWALL.